United States Patent [19]

Taylor

[11] 4,074,938

[45] Feb. 21, 1978

[54] OPTICAL DIMENSION MEASURING DEVICE EMPLOYING AN ELONGATED FOCUSED BEAM

[75] Inventor: Francis M. Taylor, Xenia, Ohio

[73] Assignee: Systems Research Laboratories, Inc., Dayton, Ohio

[21] Appl. No.: 726,991

[22] Filed: Sept. 27, 1976

[51] Int. Cl.$^2$ .............................................. G01B 11/10
[52] U.S. Cl. ..................................... 356/160; 250/560
[58] Field of Search ................ 356/160, 167; 250/548, 250/560, 571

[56] References Cited

U.S. PATENT DOCUMENTS

| 3,804,529 | 4/1974 | Hansler ................................ 356/167 |
| 4,007,992 | 2/1977 | Petrohilos et al. .................. 356/160 |

*Primary Examiner*—John K. Corbin
*Assistant Examiner*—Wm. H. Punter
*Attorney, Agent, or Firm*—Biebel, French & Nauman

[57] ABSTRACT

In an optical dimension gauging instrument, commonly referred to as a laser micrometer, particularly for use in measuring the outside dimension of elongated cylindrical objects, such as coated wires or steel tubes, in hostile optical environments, including a laser for generating a beam of collimated light, means for directing the light through a measurement zone, photodetector means responsive to the light passing through the measurement zone, and a mirror mounted for rotation by a motor to cause the beam to be scanned repeatedly across the measurement zone, a beam expander is employed to enlarge the output of the laser to a diameter substantially greater than the maximum dimension of normally anticipated foreign objects which might intercept the beam outside the measurement zone, an anamorphic lens further expands the beam in one plane to a size greater than the size of normally anticipated foreign objects both within and without the measurement zone, and a lens system causes the beam to be focused in the other plane in the measurement zone while the expanded beam is projected through the measurement zone with the long dimension of the beam parallel to the cylindrical axis of the article whose outer dimension is being measured.

3 Claims, 11 Drawing Figures

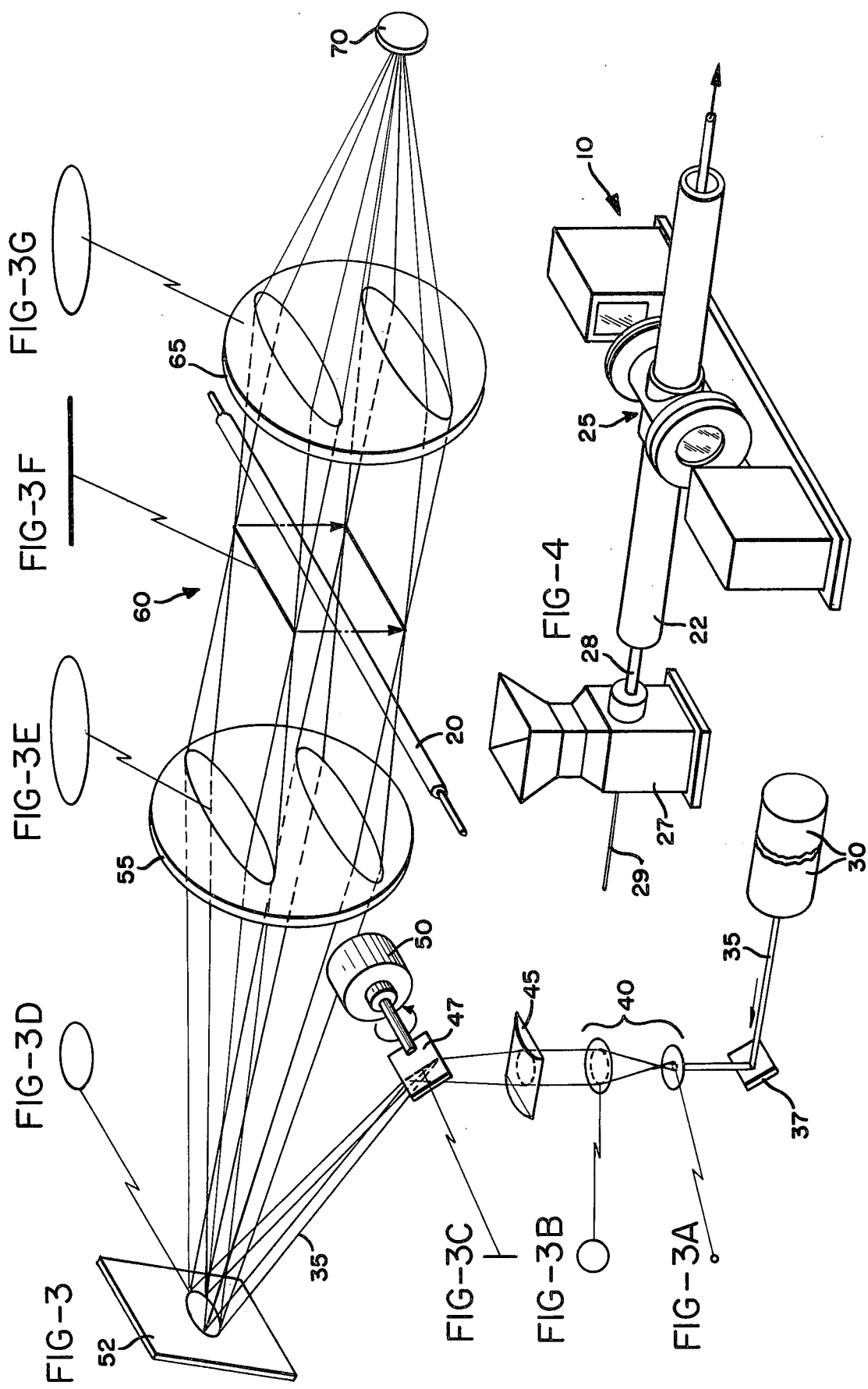

OPTICAL DIMENSION MEASURING DEVICE EMPLOYING AN ELONGATED FOCUSED BEAM

BACKGROUND OF THE INVENTION

This invention relates to improved optical dimension gauging instruments now commonly referred to as laser micrometers.

Examples of optical or laser micrometers are shown in the following U.S. Pat. Nos. : 2,812,685, 3,856,411 3,765,774, 3,856,412, 3,592,545, 3,686,437, 3,743,428, 3,870,890, 3,853,406, 3,905,705.

Laser micrometers are effective in measuring certain products by non-contact methods, and the resulting measurement signal may be used to control the process by which that product is manufactured. The accuracy and tolerance to which the end product can be made depends upon whether the laser micrometer can see the article and the nature of the disturbing influences which are present.

In certain maufacturing processes, the atmosphere surrounding the object being measured may be hostile due to dust or vapor, and in those processes where the measurement must be inside of a closed container, dirt, dust, water and other foreign objects may collect on the viewing windows.

For example, in the manufacture of insulated wires wherein material extruded on the wire is vulcanized in what is known as the continuous vulcanization process, the coated wire is enclosed in a steam tube hundreds of feet long. Attempts have been made to measure the hot diameter of the wire while in the steam tube using conventional laser micrometers positioned on either side of sight glass windows. Such attempts have only met with partial success because of the variable and optically hostile atmosphere within the tube, water droplets on the wire, in the air and on the sight glass, and occasional momentary irregularities resulting from the extruding process prevent accurate continuous diameter measurements.

Another example is in the manufacture of precision steel tubing where it is important to have an accurate measurement of the hot outside diameter of the tubing after it passes through rollers which control its dimensions. Since the tubing is frequently red hot at the desired point of measurement, a non-contacting type gauge is normally used, such as a laser micrometer. However, the optical atmosphere in a steel mill is generally poor, especially since the hot tubing is frequently surrounded by vapor, dust and dirt.

SUMMARY OF THE INVENTION

This invention relates to an optical or laser micrometer which is so constructed as to reduce the sensitivity of the dimension measurements to all objects in the ambient environment which may intercept the optical beam except those objects having a specific geometry and which occupy a specified position in space.

Specifically, the improved optical or laser micrometer of this invention may be used to measure the hot diameter of elongated cylindrical objects, such as a horizontally moving coated wire or steel tube, having a total outside diameter of one-quarter inch, for example, but it would be insensitive to a one inch diameter round or cubically shaped object or even a vertically positioned one-quarter inch diameter cylinder. Similarly, the instrument would be insensitive to a horizontally positioned one-quarter inch diameter cylindrical object located outside the measurement zone, as for example on the sight glass.

The above result is accomplished by focusing a laser beam to a thin, elongated line of light within a measurement zone, and defocusing the laser beam outside the measurement zone. Therefore, only a portion of the non-focused beam would be intercepted by an object which is not of the proper configuration (cylindrical) or which is located outside the measurement zone. For example, an object such as water or dirt on a sight glass assembly through which the laser beam is directed would be in the areas where the beam is non-focused, and therefore a substantially larger object is needed to intercept the beam at that location than would be necessary if the object were located in the measurement zone.

In a preferred embodiment of the invention, a laser beam is first expanded from approximately 0.025 inch to approximately 0.750 inch in diameter. The laser beam then passes through an anamorphic lens which focuses the beam in a first plane (horizontal, for example) onto a scanning mirror while leaving the beam in a second, orthogonal (vertical), plane collimated. A first scan lens having a focus on one side thereof on the scanning mirror, and the beam will have a horizontal length of approximately three inches at the scan lens. The elongated dimension of the beam is parallel to the cylindrical axis of the cylindrical article moving through the zone of measurement, and the scanning mirror causes the beam to be scanned vertically through the measurement zone. Since the anamorphic lens does not effect the dimension of the beam in the second or vertical plane, that beam is essentially collimated until it passes through the first scan lens which then focuses the beam to a fine line approximately 0.010 inch in thickness and three inches in length within the measurement zone. After the beam passes through the measurement zone it again expands in its vertical dimension, passes through a second scan lens and is projected onto a photodetector element.

Thus, in the region of the sight glass on either side of the measurement zone, the beam is approximately 0.750 inch thick and three inches long. Within the measurement zone, the beam is 0.010 inch thick and 3 inches long.

The vertical dimension of the beam outside the zone of measurement is made greater than any anticipated foreign object located outside the zone of measurement, and the horizontal expansion of the beam is made greater than any foreign object anticipated both within and without the zone of measurement. Also, the length of the beam in the measurement zone is longer than the momentary discontinuity or irregularity which might be introduced onto the object being measured. This insensitivity to momentary irregularities allows an optical micrometer constructed according to this invention to be used effectively in a system for the accurate control of the outside dimension of an object or the outside diameter of a coating placed on an object.

Accordingly, it is an object of this invention to provide an optical micrometer of the type described wherein the scanning beam is focused and elongated in a zone of measurement to provide accurate dimension information of cylindrical objects and defocused outside the zone of measurement to render the micrometer insensitive to objects in the ambient environment.

These and other objects and advantages of the invention will be apparent from the following description, the accompanying drawings and the appended claims.

BRIEF DESCRIPTION OF THE DRAWINGS

FIG. 3 is a diagrammatical view showing a path through which the beam travels from the source, through a beam expander, scanning mirror and lens system through the zone of measurement and then to the photodetector;

FIGS. 3A-3G represent the cross sectional configuration of the beam at various locations within the optical micrometer; and FIG. 4 is a schematic view of an apparatus for continuous vulcanization including an extruder, steam tube, sight glass assembly and optical micrometer.

DESCRIPTION OF THE PREFERRED EMBODIMENT

Figure 1:
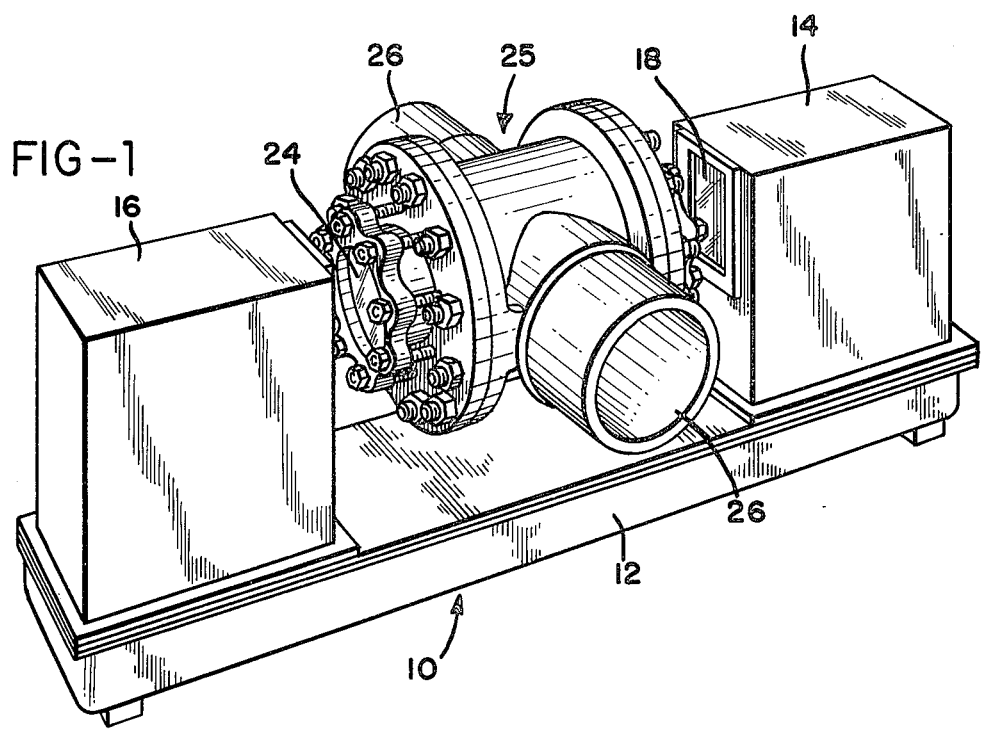
FIG. 1 is a perspective view of an optical micrometer assembly positioned to measure the diameter of an object within a sight glass assembly.

Referring now to the drawings which show a preferred embodiment of the invention, and particularly to FIG. 1, an optical micrometer 10 includes a base member 12, a first upright end housing 14 containing a beam scanning mechanism and a second upright end housing 16 containing a photodetector. Both the housings 14 and 16 include opposing glass windows 18 through which a beam of light is directed to measure the diameter of a generally cylindrical object 20 which passes through a zone of measurement located centrally between the housings 14 and 16.

As shown in FIG. 1, the cylindrical object may be passing through a special environment, such as a steam line 22 (FIG. 4), and it may be viewed through a sight glass assembly 25 aligned with the scanning beam. The assembly 25 includes projections 26 for connection with the steam line.

The sight glass assembly 25 is preferably provided with dual windows 24 on each side thereof to prevent failure of the glass due to stress, thermal shock, corrosion, erosion, external mechanical sources or overpressure conditions within the steam line. Furthermore, the wet or internal side of the glass surfaces may be provided with cleaning means to maintain the surfaces free of condensation and thus provide the optical clarity required for proper operation of the optical micrometer. The cleaning means may include steam ports for directing steam at a higher pressure than is used internally within the steam line against the glass to remove condensation droplets which might otherwise run down the internal glass surfaces. Also, other steam ports may be provided to direct additional steam against the cable to remove condensation and water droplets therefrom and thus minimize the possibility of erroneous diameter measurements.

The steam line referred to may be part of a continuous vulcanization device, and the article to be measured a wire having extruded thereon a coating which is to be cured within the steam line. In this case, the sight glass assembly 25 is preferably located near an extruder device 27 (FIG. 4) which applies a coating 28 onto the wire 29, and the measurement of the outside diameter of the coated wire may be used in a control circuit to maintain the coating at the desired thickness.

Figure 2:
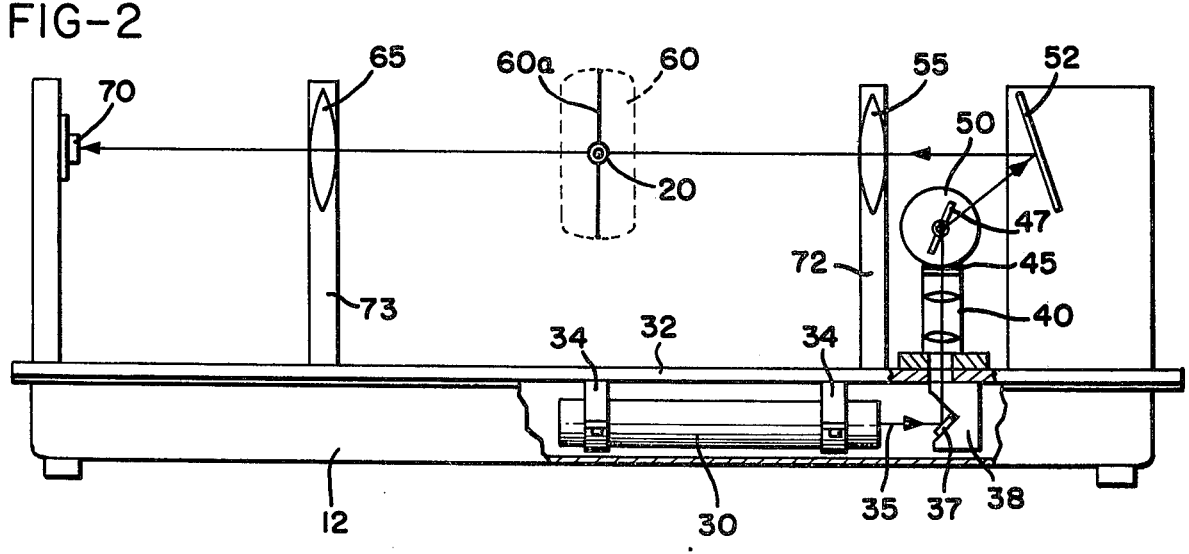
FIG. 2 is an elevational view, partly in cross section, of a preferred embodiment of the optical micrometer with the end covers being removed to show component parts thereof.

As shown in FIG. 2, the base 12 includes means for generating a beam of collimated light, such as a laser 30 which is attached to plate 32 by brackets 34. A laser power supply and other electronic components may also be located within the base 12.

The beam of collimated light 35 from the laser is reflected upwardly by a mirror 37 supported on member 38 on the underneath side of the plate 32. The beam is then directed upwardly through an opening in the plate 32 through a beam expander 40, and then through an anamorphic lens, shown generally at 45.

The modified beam is reflected off rotating mirror 47 driven by a motor 50, and then directed through a first scan lens 55, through a zone of measurement, shown generally at 60, and through a second scan lens 65, and onto a photodetector element 70. The scan lenses 55 and 65 are supported by brackets 72 and 73, respectively, mounted on the upper surface of the plate 32.

Referring now to FIG. 3, the laser 30 produces a beam of light 35 which, as shown in the cross sectional view of FIG. 3A, is generally circular and has a diameter of approximately 0.025 inch; and this beam is reflected upwardly by mirror 37 through the beam expander 40 which exits therefrom as a beam still circular in cross section but expanded to a diameter of approximately 0.750 inch, as shown by FIG. 3B. This diameter is substantially greater than the maximum dimension of any anticipated foreign objects located outside the zone of measurement.

The beam 35 then passes through anamorphic lens 45 which focused the expanded beam in a first (horizontal, for example) plane on the scanning mirror 47 while leaving the beam in a second, orthogonal (vertical), plane collimated. Thus, the horizontal dimension of the beam has been focused on the mirror 47, as represented in FIG. 3C, but the vertical dimension of the beam remains unchanged, and therefore in the vertical plane, the beam 35 remains collimated.

The mirror 47 has its reflecting coating on the outer surface thereof, and this surface is located on the axis of revolution of the shaft of the motor 50. The other side of the mirror is preferably blackened. The center of the beam 35 is preferably focused on the axis of rotation.

The first scan lens 55 has a focus on the left side, as viewed in FIG. 3, on the scanning mirror 47; and the focus on the other side of the scan lens 55 is within the zone of measurement 60, and is actually on the measurement plane 60a. Thus, the rotation of the mirror 47 causes the beam 35 to be scanned repeatedly in a vertical direction through the measurement zone as the mirror rotates.

Since the vertical plane of the beam 35 is collimated between the mirror 47 and the scan lens 55, that dimension does not change in that region. On the other hand, since the horizontal dimension of the beam was focused on the mirror 47, the beam will expand in that plane as it moves away from the mirror, and therefore the beam is in ellipse as it is reflected off mirror 52 (FIG. 3D) and the ellipse becomes further elongated at the scan lens 55, as shown in FIG. 3E. In the preferred embodiment, the horizontal elongation of the beam at the scan lens 55 is approximately 3 inches. The vertical dimension of the beam at the center is approximately 0.750 inch.

The scan lens 55, in one embodiment of the invention, is a two element lens having bi-directional focusing characteristics, and since the lens was focused on the mirror 47, the vertical plane is focused to a fine line in the zone of measurement, as shown in FIG. 3F; however, the horizontal plane will be projected through the zone of measurement as an elongated, generally collimated beam having its long dimension parallel to the cylindrical axis of the article 25 and a length greater than the size of the anticipated foreign objects located both within and without the zone of measurement 60. Of course, those foreign objects which might affect the measurement are expected to be located between the scan lenses 55 and 65.

At the second scan lens 65, the vertical dimension of the beam 35 has again expanded, as shown in FIG. 3G, although the horizontal dimension remains substantially unchanged. The second scan lens 65 collects the light passing therethrough and directs the light onto the photodetector means 70 which converts the light received into electrical signals. As is well known in this art, these signals are correlated with the rotation of the mirror 47 to produce other electrical signals which are an accurate representation of the dimension of the object within the zone of measurement.

In a preferred embodiment of the invention, the distance between the scan lenses 55 and 65 is approximately 22 inches, and the zone of measurement 60, that is, the zone wherein the accuracy measurement of the dimension of a cylindrical article therein can be determined within 0.0001 inch is approximately two inches in the horizontal plane and 4 inches in vertical plane as shown in FIG. 2, thus allowing the article 25 to be positioned anywhere within this zone of measurement and yet provide for highly accurate diameter measurements.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In an optical apparatus for continuously measuring the diameter of a cylindrical article moving axially through a zone of measurement of the type including means for generating a beam of collimated light; means, including a mirror, for causing said beam to be scanned repeatedly across the zone of measurement; and photodetector means responsive to the light passing through the zone of measurement and to the scanning means for determining the diameter of the cylindrical article;

the improvement comprising a beam expander positioned between the light generating means and the scanning means for expanding said beam to a diameter substantially greater than the maximum dimension of any anticipated foreign objects located outside the zone of measurement;

an anamorphic lens for focusing the expanded beam in a first plane on the scanning mirror while leaving said beam in a second, orthogonal, plane collimated;

a first scan lens having the focus on one side thereof on said scanning mirror and the focus on the other side thereof in said zone of measurement whereby said beam in said second plane is focused to a fine line of light in the zone of measurement while said beam in said first plane is projected through said zone of measurement as an elongated, collimated beam having its long dimension parallel to the cylindrical axis of the article and greater than the size of any anticipated foreign objects both within and without the zone of measurement; and a second scan lens for collecting the light passing through said zone of measurement and for directing said light onto said photodetector means.

2. In an apparatus for continuous vulcanization wherein an elongated article, such as a wire or cable, has extruded thereon a coating, the diameter of which is to be maintained within predetermined limits, and wherein the coating is cured in a steam tube as the article passes therethrough;

the improvement comprising a sight glass assembly positioned near the extruder in said steam tube having a zone of measurement therein through which the article passes for permitting measurement of the coating thickness in at least one plane;

and means for optically measuring the diameter of said coating including:

means for generating a beam of collimated light;

scanning means including a mirror, and means for rotating the mirror around its plane of reflection for causing said beam to scan said article in the zone of measurement;

a beam expander positioned between said light generating means and said mirror for expanding said beam to a diameter substantially greater than the maximum dimension of any anticipated foreign objects which might be present outside the zone of measurement, an anamorphic lens for focusing the expanded beam in a first plane on said mirror while the beam in a second, orthogonal plane remains collimated, a first scan lens having the focus on one side thereof on the axis of rotation of said mirror and the focus on the other side thereof in the zone of measurement whereby said beam in said second plane is focused in the zone of measurement while said beam in said first plane is projected through said zone of measurement as an elongated, collimated beam having its long dimension parallel to the direction of movement of the article and greater than the size of any anticipated foreign objects both within and without the zone of measurement;

a second scan lens for collecting the light passing through said zone of measurement; and photodetector means positioned to receive said light from said second scan lens.

3. In an optical apparatus for continuously measuring the diameter of a cylindrical article moving axially through a zone of measurement of the type including means for generating a beam of collimated light; means, including a mirror, for causing said beam to be scanned repeatedly across the zone of measurement; and photodetector means responsive to the light passing through the zone of measurement and to the scanning means for determining the diameter of the cylindrical article;

the improvement comprising means for generating a beam of light having a diameter substantially greater than the maximum dimension of any anticipated foreign objects located outside the zone of measurement;

means for exapnding said beam in a first plane;

first lens means for focusing said beam in a second, orthogonal plane to a fine line of light in the zone of measurement while projecting said expanded beam in said first plane through said zone of measurement as an elongated beam having its long dimension parallel to the cylindrical axis of the article and greater than the size of any anticipated foreign objects both within and without the zone of measurement; and a second lens means for collecting the light passing through said zone of measurement and for directing said light onto said photodetector means.

* * * * *